Oct. 21, 1952     S. J. CITSO     2,614,879
DETACHABLE HANDLE FOR SHOVELS OR THE LIKE
Filed Oct. 24, 1947
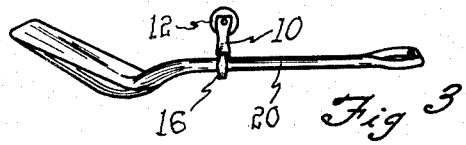
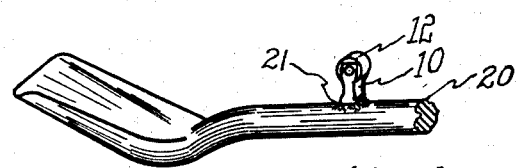
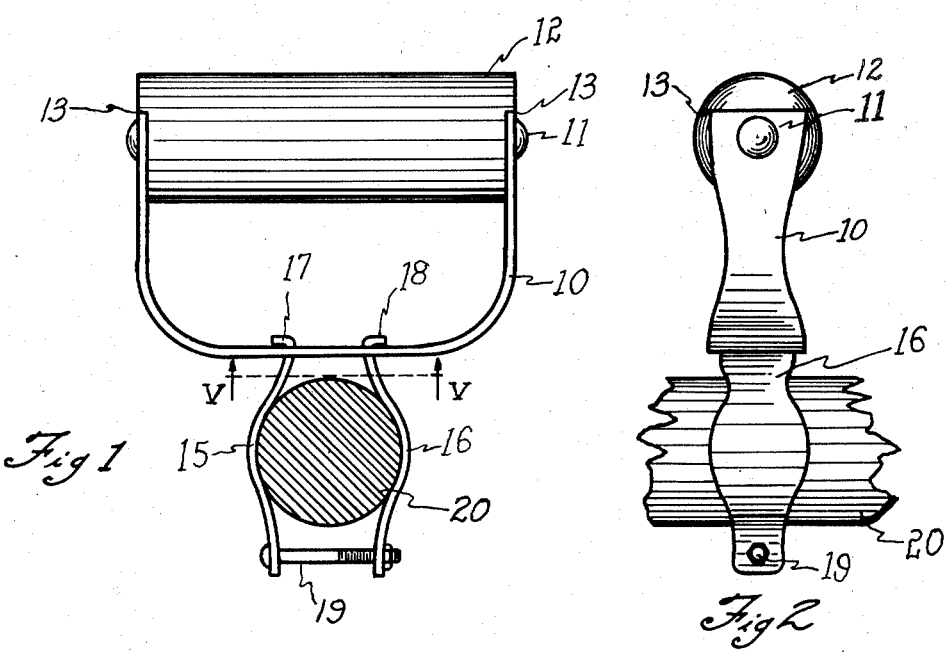
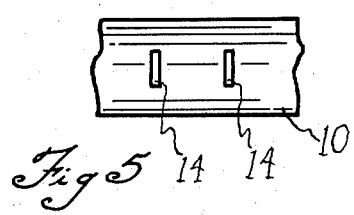
INVENTOR.
Steven J. Citso
BY John F. Bregina
Attorney Patented Oct. 21, 1952

2,614,879

UNITED STATES PATENT OFFICE 2,614,879

DETACHABLE HANDLE FOR SHOVELS OR THE LIKE

Steven J. Citso, Chicago, Ill.

Application October 24, 1947, Serial No. 781,969

1 Claim. (Cl. 294—58)

This invention is directed to detachable handles for shovels and other handle-bearing tools.

It is an important object of my invention to provide easily attachable and detachable grippable handles for shovels in which the main body member is composed of a single piece of flat metal and of U-shape and having a plurality of spaced holes or slots therein and a pair of metal clamp members adapted to be secured into mounted position by a bolt or the like.

A further object of my invention is the provision of novel attachable handle devices for shovels or the like having clamping members connected thereto, whereby the devices may be adjustably mounted in desired positions on a handle of a shovel or other hand tool, or which may if desired be permanently secured to such handles.

Other and further important objects of my invention will be apparent from the following description and appended claim.

This invention (in one form) is illustrated in the accompanying drawings and described in the following specification, having reference numerals shown in the drawings.

On the drawings:

Figure 1 is a front elevational view of my attachable grippable handle illustrated as mounted on the regular handle of a shovel, the latter being shown in cross section.

Figure 2 is a side elevation thereof.

Figure 3 is a reduced elevation of one type of shovel having my auxiliary grippable handle clamped thereon.

Figure 4 is an elevation of one form of shovel having the main body portion of my auxiliary handle permanently secured on the elongated handle of the shovel.

Figure 5 is an enlarged view of a section of the main body portion of my auxiliary handle and taken substantially on line V—V of Fig. 1.

As shown on the drawings:

Referring to the drawings, reference numeral 10 designates a metal frame yoke or body portion of substantially U-shape and which is preferably formed from a substantially flat metal strap of the desired and adequate thickness. The opposite end portions of the frame 10 has a pair of aligned holes formed therein. A rounded elongated passaged grip 12 is securely mounted between the substantially parallel end portions of frame 10 and a bolt or rivet 11 passes through said grip 12 and through said aligned holes, the outer ends thereof being secured by riveting or the like. The opposite end faces of the grip 12 are preferably recessed as indicated in Fig. 1 so that, that portion of the grip beyond the ends of the yoke or frame 10 is longer and projects slightly beyond the recesses respectively to form shoulders 13, which abut ends of the frame 10 respectively to prevent the grip from rotating during use.

The intermediate portion of the yoke or frame 10 has a pair of spaced apart slots or openings 14 formed therein, as illustrated in Fig. 5. Numerals 15 and 16 are a pair of metal levers or clamping members of curved form which have one of the ends of each thereof bent abruptly to form hooks 17 and 18 as illustrated in Fig. 1. The opposite ends of said levers 15 and 16 are apertured, and in such substantially aligned apertures is removably mounted a bolt 19.

Where it is desired to attach and mount the auxiliary handle on the elongated handle 20 of a shovel, the hooks 17 and 18 of the two levers 15 and 16 are inserted into slots 14 in the manner illustrated in Fig. 1; the same positioned about the shovel handle at the desired position and the bolt 19 inserted and the nut thereof tightened so that the frame or handle member 10 will thereby be rigidly secured to the shovel. As the bolt 19 is tightened, the hooked ends of the levers press firmly against the edges of the slots 14.

As different persons are of different heights and have arms of varying lengths, the auxiliary handle may be easily and quickly unclamped and resecured in the position desired by the particular user.

For some uses where shovels are used for food products or ingredients where daily cleaning is a necessity and where spaces for entrapment of food particles are to be avoided, I provide a mounting of the auxiliary handle substantially as illustrated in Fig. 4. In this form of mounting the yoke or frame 10 is secured to the metal elongated shovel handle 20 by welding 21 which joins the intermost portion of the frame 10 to the shovel. This provides for easier cleaning of any material which would adhere to or become lodged between the clamping members and the shovel.

One advantage of my auxiliary grippable handle is that a user does not have to bend over as far during use of the shovel and considerably less effort is expended and more work can be accomplished with less effort in a given time. Another advantage is that in the lifting movement the full strength of a user gripping said handle hand is available and it is easier to lift and move the loaded shovel because the user will be more erect and less "bent over" during the work motions.

The present invention has been described herein more or less as to details, yet it is to be understood that the invention is not to be limited thereby, as changes may be made in the arrangement and proportion of parts and equivalents may be substituted without departing from the spirit and scope of the invention.

I claim:

In an auxiliary grippable handle adapted to be attached to intermediate portions of shovels or the like; a substantially U-shaped metal yoke, said yoke having a pair of spaced slots in its intermediate portion; a grip secured between the opposite ends of said yoke; a pair of clamping members each having a hook at the inner end thereof, said hooks each engaging one of said slots, said clamping members being substantially uniformly spaced from each other and throughout their entire lengths; and a releasable bolt normally connecting the outer ends of said clamping members together and about a shovel handle or the like.

STEVEN J. CITSO.

REFERENCES CITED

The following references are of record in the file of this patent:

UNITED STATES PATENTS

| Number | Name | Date |
|---|---|---|
| 842,912 | Rundell | Feb. 5, 1907 |
| 1,083,054 | Brown | Dec. 30, 1913 |
| 1,151,012 | Herringstad | Aug. 24, 1915 |
| 1,524,168 | Burns | Jan. 27, 1925 |
| 1,790,638 | Fox | Jan. 27, 1931 |

FOREIGN PATENTS

| Number | Country | Date |
|---|---|---|
| 235,320 | Great Britain | June 15, 1925 |
| 489,838 | Great Britain | Aug. 4, 1938 |